Figure 1:
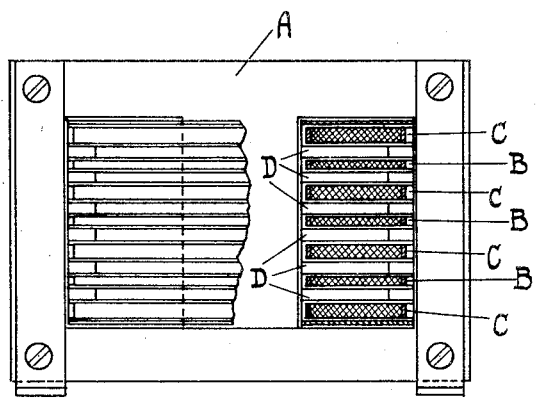

March 28, 1933.   P. W. WILLANS ET AL   1,903,075

ELECTRICAL TRANSFORMER

Filed Nov. 11, 1924

INVENTORS
P. W. WILLANS
MARK WARD
BY
ATTORNEY

Patented Mar. 28, 1933

1,903,075

UNITED STATES PATENT OFFICE

PETER WILLIAM WILLANS, OF TOWCESTER, AND MARK WARD, OF LONDON, ENGLAND, ASSIGNORS TO RADIO CORPORATION OF AMERICA, A CORPORATION OF DELAWARE

ELECTRICAL TRANSFORMER

Application filed November 11, 1924, Serial No. 749,128, and in Great Britain December 17, 1923.

The object of this invention is to provide an intervalve low frequency transformer which shall give constant amplification over a wide range of frequencies.

In order that constant amplification may be possible it is necessary that the impedance of the primary winding should be, for all frequencies included in the range under consideration, large in comparison with that of the valve but in order that a satisfactory set-up ratio may be attained it is necessary that the secondary should have a high impedance. If therefore we neglect the magnetic leakage of the transformer the problem of designing the transformer to give the desired results reduces itself to constructing a transformer the secondary of which has the highest possible impedance at all frequencies and then using a sufficient number of turns in the primary to bring the impedance of the primary to a value which is large in comparison with that of the valve with which the transformer is to be used.

It is, however, necessary also to consider the effect of magnetic leakage since any undue amount of leakage causes abnormal amplification on the higher frequencies, and we have found that with a transformer of given construction as regards winding space, the greater the secondary inductance, the greater this abnormality, and therefore it is necessary for constant amplification that the leakage inductance should be as small as possible.

The effective leakage inductance of the secondary may be regarded for the present purpose as the inductance of the secondary when the primary is shortcircuited. Therefore to attain constant amplification we have to make the inductance of the secondary as large as possible when the primary is opencircuited and as small as possible when the primary is shortcircuited.

According to this invention we construct an intervalve low frequency transformer in which the secondary has an inductance of more than 200 henries when the primary circuit is open and of less than 6 henries when the primary is shortcircuited.

Preferably we divide the primary or the secondary or both into a number of sections which are separated from each other by the whole or a part of the other winding as by thus intermingling the primary and secondary windings we can reduce the magnetic leakage to a very small amount.

Since the inductance of an iron-cored coil varies with the amplitude of the alternating current passing through it, it is necessary in designing a transformer to obtain the requisite impedance at the very lowest flux densities under consideration; further since the proportion of flux carried by the iron is smaller under such conditions, more careful attention must be given to the question of magnetic leakage. We, therefore, measure inductances by an alternating current bridge method at flux densities of less than 50 lines per square centimetre and the limits of inductance above referred to are to be understood as corresponding to such a method of measurement. Further since the capacity of the secondary winding enters into the measurements, these must be carried out at a frequency sufficiently low for the capacity effect to be negligible.

In the case of inductances of 200 henries and under we have found that satisfactory measurements can be made on a frequency of 256 cycles; our transformers are therefore constructed so that the secondary has at such a frequency an impedance with the primary opencircuited, greater than that of a pure inductance of 200 henries, and an impedance with the primary shortcircuited, less than that of a pure inductance of 6 henries, or in other words, to have effective inductance values of 200 and 6 henries, respectively under these conditions.

It is to be understood in the above measurements that the polarization of the iron core of the transformer is to be substantially the same as under working conditions and exactly the same for the two measurements with primary open and shortcircuited.

It is well known that the effect of capacity in the windings of a transformer is to reduce its impedance to high frequencies and thus to reduce its amplification at such frequencies. In order to counteract this effect, which is accentuated in the present transformer by the intermingling of the windings, we space the sections apart. For instance, we employ separators made of the minimum amount of material necessary to secure mechanical rigidity between the sections, the greater part of the space being occupied by air. We have found that a separation of the sections by 0.01 inch of air produces a marked decrease in the effective capacity though if a dielectric of higher dielectric constant were employed a proportionate increase in spacing would be required to produce the same effect.

Figure 2:
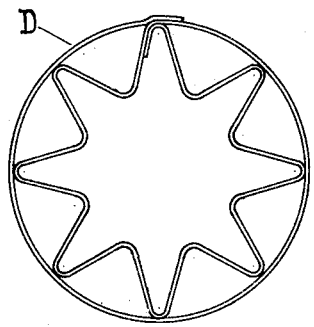
Figure 3:
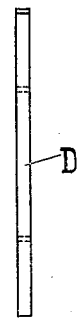
Figure 4:
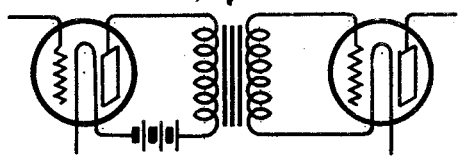

Our invention is illustrated by the accompanying drawing, in which Figure 1 is a vertical section of a transformer, Figures 2 and 3 are detail views of the spacing pieces and Figure 4 is a diagrammatic showing of our transformer incorporated in an audio frequency amplifier stage.

In Figure 1, A is a closed iron core, B are the primary sections, C the secondary sections and D the spacing pieces introduced between the primary and secondary sections. These spacing pieces consist of strips of thin mill-board cut to a width corresponding to the desired spacing and made up in a convenient way to give rigidity. The sections are thus spaced apart mainly by air, the amount of material employed being as small as possible consistent with structural strength.

Having described our invention what we claim is:

1. A spacer for a transformer in which the windings are separated into a plurality of sections, comprising a single thin strip of material bent to form a washer like member, said member having a minimum amount of material with a maximum rigidity whereby the plurality of sections are separated largely by air.

2. The combination of a pair of valves and a low frequency coupling therebetween, said low frequency coupling comprising a winding in the output circuit of one of said valves that has an impedance which is large compared to the impedance of that valve whereby substantially uniform amplification is obtained over the audi frequency range and a winding in the input circuit of the other one of said valves that has an impedance which is large compared to the impedance of the first mentioned winding when said first mentioned winding is open-circuited whereby a substantial step-up of voltage is possible and which is small compared to the impedance of the first mentioned winding when said first mentioned winding is short-circuited whereby tight coupling is attained.

3. The combination of a pair of valves and a low frequency coupling therebetween, said low frequency coupling comprising a winding in the output circuit of one of said valves that has an impedance which is large compared to the impedance of that valve whereby substantially uniform amplification is obtained for all frequencies in the audible range and a winding in the input circuit of the other one of said valves that has an inductance of more than 200 henries when said first mentioned winding is open circuited and which has an inductance of less than 6 henries when said first mentioned winding is short circuited.

4. In combination an intervalve low frequency transformer, a pair of valves to which said transformer is connected, a primary winding of said transformer having an impedance which is large compared with the impedance of the valve to which it is connected whereby substantially uniform amplification is obtained over the audio frequency range, and a secondary winding of said transformer having an impedance which if measured with the primary open circuited is large compared to the impedance of the primary winding whereby a substantial step-up of voltage is possible, said windings being tight coupled whereby said secondary winding has an apparent impedance which when measured with the primary winding short circuited is small compared to said impedance of the primary winding.

PETER WILLIAM WILLANS.
MARK WARD.